US012078947B2

(12) United States Patent
Uehara

(10) Patent No.: US 12,078,947 B2
(45) Date of Patent: Sep. 3, 2024

(54) IMAGE FORMING APPARATUS

(71) Applicant: Canon Kabushiki Kaisha, Tokyo (JP)

(72) Inventor: Takashi Uehara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/154,141

(22) Filed: Jan. 13, 2023

(65) Prior Publication Data

US 2023/0251593 A1 Aug. 10, 2023

(30) Foreign Application Priority Data

Jan. 18, 2022 (JP) ................................ 2022-005896

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 2215/2038* (2013.01)

(58) Field of Classification Search
CPC ............. G03G 15/205; G03G 15/2064; G03G 15/5004; G03G 2215/2038; G03G 15/2039
See application file for complete search history.

(56) References Cited

U.S. PATENT DOCUMENTS

| | | | | |
|---|---|---|---|---|
| 2004/0245235 A1* | 12/2004 | Kishi | G03G 15/2053 | 219/216 |
| 2007/0242969 A1* | 10/2007 | Ishii | G03G 15/205 | 399/68 |
| 2013/0195491 A1* | 8/2013 | Suzuki | G03G 15/2039 | 399/122 |
| 2014/0133880 A1* | 5/2014 | Otsuka | G03G 15/2039 | 399/334 |
| 2021/0373471 A1 | 12/2021 | Toratani et al. | | |

FOREIGN PATENT DOCUMENTS

| | | | |
|---|---|---|---|
| EP | 2730979 A2 | 5/2014 |
| JP | 2003-323085 A | 11/2003 |
| JP | 2005-055705 A | 3/2005 |
| JP | 2008-146712 A | 6/2008 |
| JP | 2008-217823 A | 9/2008 |
| JP | 2017-021173 A | 1/2017 |

OTHER PUBLICATIONS

Extended European Search Report issued on Jun. 21, 2023 in counterpart European Patent Appln. No. 23151940.6.

* cited by examiner

*Primary Examiner* — Sandra Brase
(74) *Attorney, Agent, or Firm* — Venable LLP

(57) ABSTRACT

An image forming apparatus includes: a heating unit including a heating rotation member configured to heat a recording medium: a pressure rotation member which contacts the heating rotation member to form a nip portion to fix a toner image to the recording medium, a heat source configured to heat the heating rotation member, the heat source including a first heater and a second heater, and a control unit configured to control the first heater and the second heater, wherein the image forming unit is operable to transition to: a fixing state in which an operation to fix the toner image to the recording medium is performed by receiving a job; and a standby state, to wait for the job, in which an operation to fix the toner image to the recording medium is not performed.

15 Claims, 8 Drawing Sheets

| SHEET WIDTH | ~148 | 148~297 | 297~ |
|---|---|---|---|
| HALOGEN HEATER 341 | 100% | 100% | 0% |
| HALOGEN HEATER 342 | 0% | 0% | 100% |
| HALOGEN HEATER 343 | 50% | 50% | 80% |
| HALOGEN HEATER 344 | 0% | 100% | 100% |
| HALOGEN HEATER 345 | 0% | 0% | 100% |
| HALOGEN HEATER 346 | 100% | 50% | 100% |

FIG. 6

| | WAVE FORM A | WAVE FORM B | WAVE FORM C | WAVE FORM D |
|---|---|---|---|---|
| OPERATION MODE | PRINT | PRINT | STANDBY | STANDBY |
| HALOGEN HEATER 341 | ○ | ○ | × | ○ |
| HALOGEN HEATER 342 | × | ○ | × | × |
| HALOGEN HEATER 343 | ○ | ○ | ○ | ○ |
| HALOGEN HEATER 344 | ○ | ○ | ○ | ○ |
| HALOGEN HEATER 345 | ○ | ○ | ○ | ○ |
| HALOGEN HEATER 346 | ○ | ○ | ○ | ○ |
| TOTAL POWER | 4000W | 5000W | 3000W | 4000W |

FIG. 8

IMAGE FORMING APPARATUS

BACKGROUND OF THE INVENTION

Field of the Invention

The present disclosure relates to an image forming apparatus which forms an image on a recording medium using an electrophotographic method.

Description of the Related Art

An electrophotographic image forming apparatus forms an image on a recording medium using an electrophotographic process. An electrophotographic image forming apparatus includes, for example, electrophotographic copiers (e.g., digital copiers), electrophotographic printers (e.g., color laser beam printers), MFPs (complex machines), facsimile machines, word processors, and the like. Such image forming apparatuses are used for forming a monochrome image or a color image.

The electrophotographic image forming apparatus includes two or more process units, such as a photoconductor, a charger, an exposure unit, a developing unit, a transfer unit, and a fixing unit. The charger uniformly charges a surface of a photosensitive member as an image carrier. The exposure unit irradiates and scans the uniformly charged surface of the photosensitive member with a laser beam (hereinafter referred to as "light beam") modulated according to image information to thereby create an electrostatic latent image onto the surface of the photoreceptor. The developing unit develops the electrostatic latent image with a developer agent (toner) to thereby form a developed image (toner image). The transfer unit transfers the toner image formed on the photosensitive member onto the recording medium. The fixing unit heats and pressurizes the recording medium, onto which the toner image has been transferred, to thereby fix the toner image to the recording medium. Thus, the image forming apparatus forms an image onto the recording medium.

Japanese Patent Application Laid-open No. 2017-021173 describes a fixing unit which uses a halogen heater as a heat source. Such a fixing unit includes a pressure rotation member, and a heating rotation member such as a roller or a belt in which a halogen heater is installed. The halogen heater transmits radiant heat generated by energization to the heating rotation member. The fixing unit fixes the toner image to a recording medium by heat and pressure while nipping and conveying the recording medium, which carries an unfixed toner image, at a fixing nip portion where the heating rotation member and the pressure rotation member contact. Japanese Patent Application Laid-open No. 2008-146712 discloses a fixing device having a configuration in which a plurality of halogen heaters with large electric power are arranged on a roller having a large heat capacity. Such a fixing device is suitable for high-speed image forming apparatuses. In this case, the plurality of halogen heaters are supplied with power from a plurality of power supply systems since the power supply capacity of one power supply system is not sufficient.

A fixing device that requires a large amount of power may become, for example, an abnormal energization state due to a failure in any of the control system, parts, or power supply. Abnormal heating may occur in the abnormal energization state, and parts may be damaged. For this reason, the image forming apparatus is equipped with a damage prevention mechanism which detects abnormal heating to stop an operation of the fixing device, thereby damages due to the abnormal heating of the parts of the fixing device is prevented.

However, when the power at the time of the abnormal energization state is large, the temperature of the fixing device greatly rises in a period from when the damage prevention mechanism detects abnormal heating to when the operation of the fixing device is stopped. Therefore, it is necessary to quickly suppress the power at the time of the abnormal energization state. Furthermore, when the temperature of a heater is controlled in a standby mode in order to shorten the first print time, the rotation speed of the heating rotator is slower than the rotation speed in a normal print mode, thus, the temperature rise of the fixing unit increases in the abnormal energization state, Therefore, even in the standby mode, it is necessary to suppress the electric power according to the rotation speed.

SUMMARY OF THE INVENTION

An image forming apparatus according to the present disclosure includes: a heating unit including a heating rotation member configured to heat a recording medium: a pressure rotation member which contacts the heating rotation member to form a nip portion to fix a toner image to the recording medium, a heat source configured to heat the heating rotation member, the heat source including a first heater and a second heater, and a control unit configured to control the first heater and the second heater, wherein the image forming unit is operable to transition to: a fixing state in which an operation to fix the toner image to the recording medium is performed by receiving a job; and a standby state, to wait for the job, in which an operation to fix the toner image to the recording medium is not performed, wherein a rotation speed of the heating rotation member in the standby state is lower than the rotation speed of the heating rotation member in the fixing state, wherein the control unit is configured to: stop supplying power to the first heater and allow supplying power to the second heater in the standby state; and allow supplying power to the first heater and stop supplying power to the second heater in the fixing state.

Further features of the present invention will become apparent from the following description of exemplary embodiments (with reference to the attached drawings).

BRIEF DESCRIPTION OF THE DRAWINGS

FIG. 6 is a table illustrating a power supply duty of a halogen heater.

FIG. 8 is an explanatory diagram of a total power of halogen heaters and an operation mode.

DESCRIPTION OF THE EMBODIMENTS

In the following, at least one embodiment of the present disclosure is described with reference to the drawings.

Figure 1:
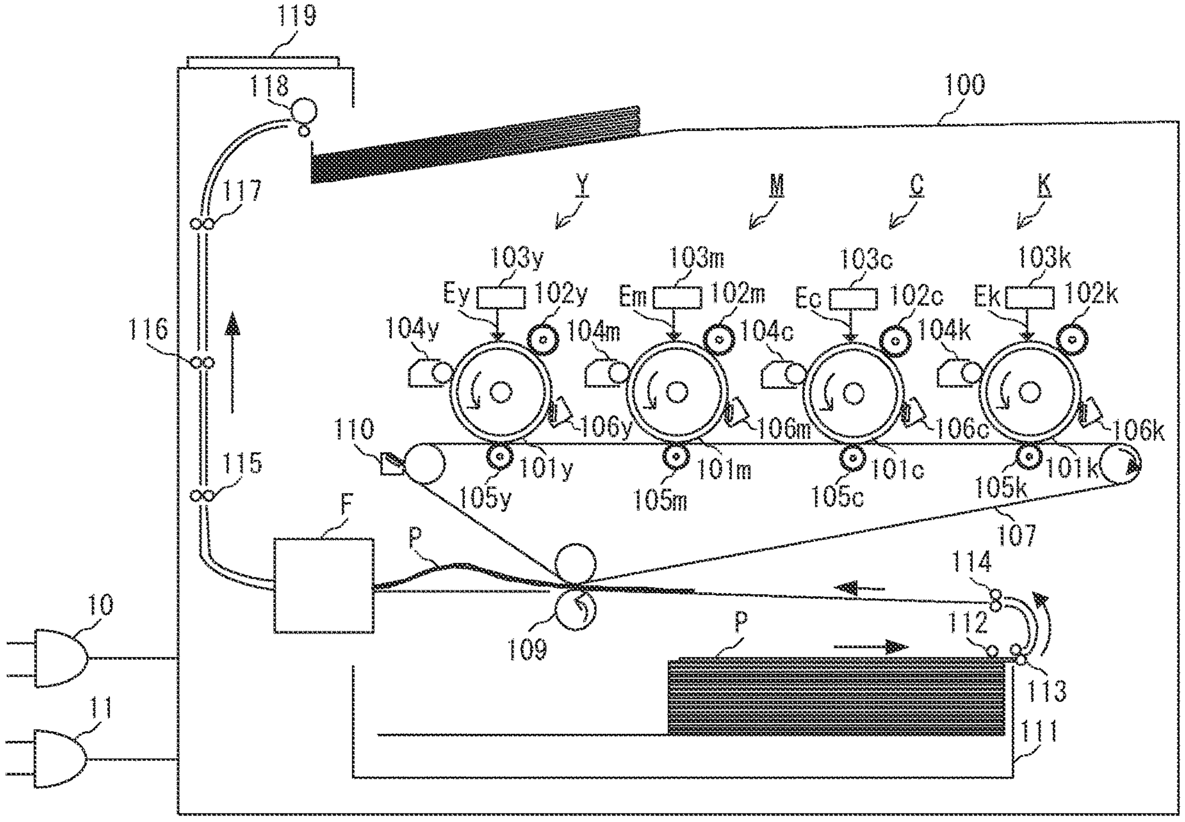
FIG. 1 is a configuration diagram of an image forming apparatus.

FIG. 1 is a configuration diagram of an image forming apparatus according to a first embodiment of the present disclosure. The image forming apparatus 100 is a full color image forming apparatus which forms an image of two or more colors (four colors in the present embodiment) to print a full color image on a recording medium P. Therefore, the image forming apparatus 100 includes two or more (four in the present embodiment) image forming units (first to fourth image forming units Y, M, C, and K). A first image forming unit Y forms a yellow (y) image. A second image forming unit M forms a magenta (m) toner image. A third image forming unit C forms a cyan (c) toner image. A fourth image forming unit K forms a black (k) toner image. Hereinafter, a configuration of the yellow image forming unit is described, and a description of the configurations of the image forming units for other colors is omitted.

The first image forming unit Y includes a photosensitive drum 101*y*, which is a first image bearing member, a charging roller 102*y*, an exposure unit 103*y*, a developing unit 104*y*, a primary transfer roller 105, and a photosensitive member cleaner 6*a*. The exposure unit 103*y* emits a laser light Ey. An intermediate transfer belt 107, which is a second image bearing member, is provided between the photosensitive drum 101*y* and the primary transfer roller 105*y*. A secondary transfer unit is formed between secondary transfer rollers 109 and the intermediate transfer belt 107. The recording medium P, stored in a sheet feed cassette 111, is conveyed to the secondary transfer rollers 109 in accordance with timings of image forming by the first image forming unit Y, the second image forming unit M, the third image forming unit C, and the fourth image forming unit K. A pickup roller 112, sheet feed rollers 113, and registration rollers 114 are provided in a conveyance path from the sheet feed cassette 111 to the secondary transfer rollers 109. A fixing unit F is arranged downstream of the secondary transfer rollers 109 in a conveyance direction of the recording medium P.

The image forming apparatus 100 is supplied with power via power cords 10 and 11 from a commercial power source. The image forming apparatus 100 includes a power supply board (not shown). The power supply board converts power supplied from the commercial power source into power used inside the image forming apparatus 100 to supply power to each unit of the image forming apparatus 100. The image forming apparatus 100 includes an operation unit 119 as a user interface, and a CPU (Central Processing Unit), which will be described later, as a controller. The CPU acquires an image forming command from an external device (not shown) or the operation unit 119 to thereby drive the photosensitive drum 101*y*, the developing unit 104*y*, the secondary transfer rollers 109, and rollers in the fixing unit F at a respective predetermined process speed by a drive unit (not shown).

The photosensitive drum 101*y* is a drum-shaped photosensitive member having a charged layer on its surface. A charging roller 102, which is a charger, uniformly charges a surface of the rotating photosensitive drum 101*y* with a predetermined polarity and potential. The exposure unit 103*y* irradiates and scans the uniformly charged surface of the photosensitive drum 101*y* with a light beam. An electrostatic latent image is formed on the surface of the photosensitive drum 101*y* by changing a potential of an irradiation position of the light beam. The developing unit 104*y* develops the electrostatic latent image with yellow toner. Thus, a yellow toner image is formed on the surface of the photosensitive drum 101*y*. Similarly, a magenta toner image is formed on the surface of the photosensitive drum 101*m*. A cyan toner image is formed on the surface of the photosensitive drum 101*c*. A black toner image is formed on the surface of the photosensitive drum 101*k*.

The toner image formed on the photosensitive drum 101*y* is transferred to the intermediate transfer belt 107 by the corresponding primary transfer roller 105*y*. Toner remaining on the photosensitive drum 101*y* after transfer is collected by the photosensitive member cleaner 106*y*. The toner images formed on the photosensitive drums 101*m*, 101*c*, and 101*k* are also transferred to the intermediate transfer belt 107 in the same manner. At this time, the toner images on the respective photosensitive drums 101*y*, 101*m*, 101*c*, and 101*k* are transferred onto the intermediate transfer belt 107 so as to be superimposed. Thus, a full-color toner image is formed on the intermediate transfer belt 107. The intermediate transfer belt 107 rotates to convey the transferred toner image to the secondary transfer rollers 109.

The recording medium P is fed from a sheet feed cassette 111 by the pickup roller 112 at a predetermined timing. The sheet feed rollers 113 separate the recording medium P fed by the pickup roller 112 one by one and conveys it to the registration rollers 114. The registration rollers 114 correct skew of the recording medium P conveyed by the sheet feed rollers 113. The registration rollers 114 conveys, after correcting the skew, the recording medium P to the secondary transfer rollers 109 in synchronization with a timing at which the toner image borne on the intermediate transfer belt 107 is conveyed to the secondary transfer roller 109.

The full-color toner image borne on the intermediate transfer belt 107 is collectively transferred onto the surface of the recording medium P by the secondary transfer roller 109. The secondary transfer roller 109 transfers the toner image from the intermediate transfer belt 107 onto the recording medium P by applying a high voltage from a high voltage circuit board (not shown). The toner remaining on the intermediate transfer belt 107 after transfer is collected by an intermediate transfer belt cleaner 110.

The recording medium P onto which the toner image has been transferred is conveyed to the fixing unit F by the secondary transfer roller 109. The fixing unit F fixes the toner image to the recording medium P by heating and pressing the recording medium Ponto which the toner image has been transferred. The recording medium P to which the toner image has been fixed is conveyed to a discharge roller 118 by conveyance rollers 115, 116, and 117 provided in the conveyance path. The discharge roller 118 discharges the recording medium P conveyed by the conveyance rollers 115, 116, and 117 to an outside of the image forming apparatus 100. Thus, the recording medium P (printed matter) on which a color image has been formed is obtained.

Figure 2:
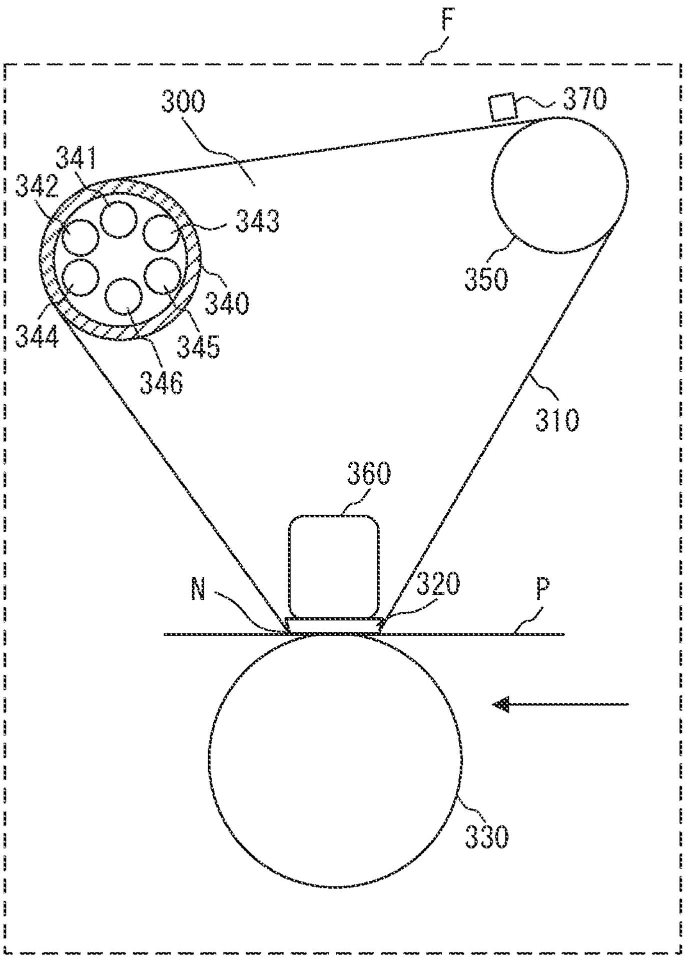
FIG. 2 is a configuration diagram of a fixing unit.

FIG. 2 is a configuration diagram of the fixing unit F. The fixing unit F of the present embodiment is of a belt heating type. The fixing unit F includes a heating unit 300 and a pressure roller 330. The heating unit 300 includes an endless rotatable fixing belt 310 (rotation member), a pressure pad 320 as a fixing member, a stay 360, a heating roller 340 as a heating rotation member, and a tension roller 350. The pressure roller 330 is biased toward the fixing belt 310, and is a pressure rotation member which forms a nip portion N with the fixing belt 310.

The fixing belt 310 has thermal conductivity and heat resistance and the like, and has a thin-walled cylindrical shape with an inner diameter of 120 mm, for example. In this embodiment, the fixing belt 310 has a three-layer structure including a base layer, an elastic layer around the base layer, and a releasing layer around the elastic layer. The base layer has a thickness of 60 μm and is made of polyimide resin (PI).

The elastic layer has a thickness of 300 μm and is made of silicone rubber. The releasable layer has a thickness of 30 μm and is made of PFA (tetrafluoroethylene-perfluoroalkoxyethylene copolymer resin) as a fluororesin. The fixing belt 310 is stretched by the pressure pad 320, the heating roller 340, and the tension roller 350.

A sensor unit 370 for detecting a rotation speed of the fixing belt 310 is arranged in contact with an outer surface of the fixing belt 310. The sensor unit 370 outputs a pulse signal corresponding to a rotation speed of the fixing belt 310. The faster the rotation speed, the higher the frequency of the pulse signal, and the slower the rotation speed, the lower the frequency of the pulse signal.

The pressure pad 320 is pressed against the pressure roller 330 via the fixing belt 310. The material of the pressure pad 320 is, for example, LCP (liquid crystal polymer) resin. The heating roller 340 is, for example, a stainless steel pipe with an outer diameter of 40 mm and a thickness of 1 mm, and has a plurality of (six in this embodiment) halogen heaters 341 to 346 in its inside as heat sources. The halogen heaters 341 to 346 are controlled by a control board (not shown) so as to generate heat up to a predetermined temperature.

The fixing belt 310 is heated by the heating roller 340. The fixing unit F has a thermistor, which will be described later, for detecting a temperature of the heating roller 340. The temperature of the fixing belt 310 is controlled to a predetermined target temperature corresponding to a sheet type of the recording medium P based on a temperature detection result of the thermistor. The tension roller 350 is, for example, a stainless steel pipe with an outer diameter of 40 mm and a thickness of 1 mm, and its ends are rotatably supported by bearings (not shown). The tension roller 350 is biased by a spring supported by a frame (not shown) of the heating unit 300 to apply a predetermined tension to the fixing belt 310. The tension roller 350 is driven to rotate with respect to the fixing belt 310. The tension by the spring is, for example, 50N. By applying tension to the fixing belt 310, the fixing belt 310 follows the pressure pad 320. The sensor unit 370 is arranged near the tension roller 350.

The pressure roller 330 is a roller having an elastic layer on an outer circumference of its shaft and a releasable layer formed on an outer circumference of the elastic layer. The material of the shaft is, for example, stainless steel. The elastic layer is made of conductive silicone rubber with a thickness of 5 mm, for example. The releasable layer is made of, for example, PFA (tetrafluoroethylene-perfluoroalkoxyethylene copolymer resin) as a fluororesin having a thickness of 50 μm.

The fixing unit F heats the toner image by nipping and conveying the recording medium P bearing the toner image in the nip portion N formed between the fixing belt 310 and the pressure roller 330. The toner image is melted by being heated and fixed to the recording medium P by being pressed. In this manner, the fixing unit F fixes the toner image on the recording medium P while nipping and conveying the recording medium P.

Figure 3A:
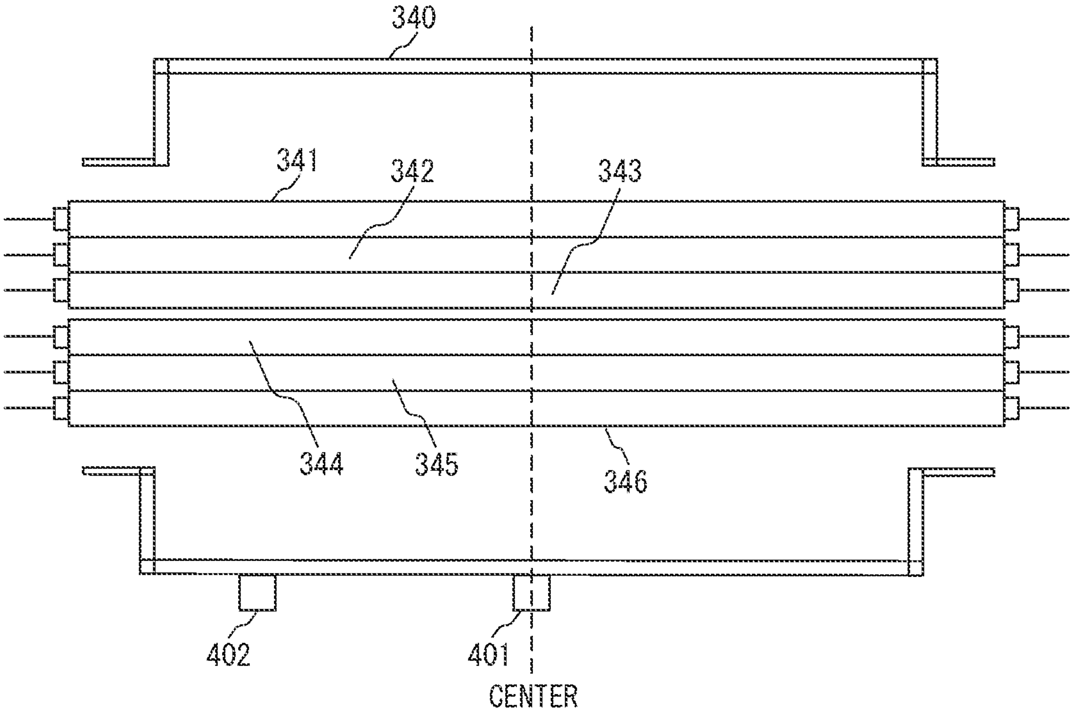
FIG. 3A and FIG. 3B are explanatory diagrams of heating rollers.
Figure 3B:
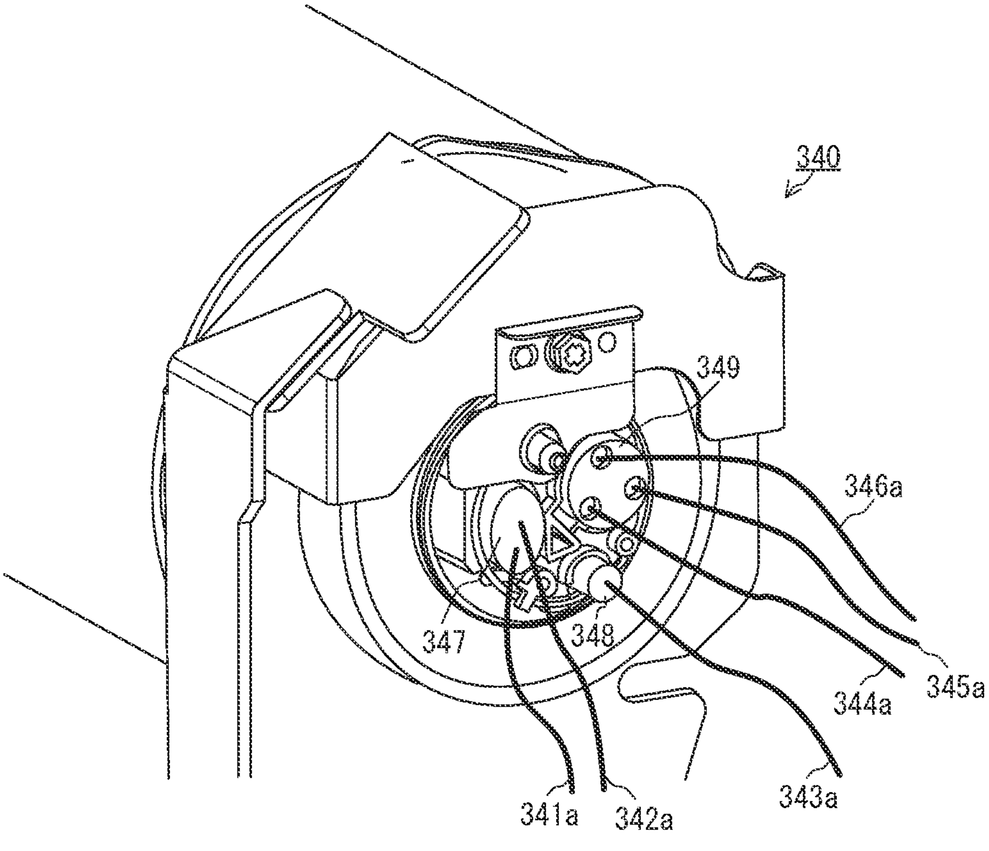

FIG. 3A and FIG. 3B are explanatory diagrams of the heating roller 340. FIG. 3A is a schematic diagram of a cross section of the heating roller 340 in a rotation axis direction. The halogen heaters 341 to 346 are supported by holders (not shown) inside heating roller 340. Thermistors 401 and 402 are arranged in contact with the heating roller 340. The thermistor 401 detects a surface temperature of a central portion of heating roller 340 in the axial direction. The thermistor 402 detects a surface temperature of an axial end of the heating roller 340.

FIG. 3B is an external view of the axial end of the heating roller 340. The halogen heaters 341 to 346 are composed of a glass tube through which a filament passes and bases 347 to 349, which are connected to both ends of the glass tube. Corresponding to the halogen heaters 341 to 346, lead wires 341*a* to 346*a* are connected to the bases 347 to 349. The halogen heater 341 and the halogen heater 342 are connected to the base 347. Lead wires 341*a* and 342*a* are connected to the base 347. The halogen heater 343 is connected to the base 348. A lead wire 343*a* is connected to the base 348. The halogen heaters 344 to 346 are connected to the base 349. Lead wires 344*a* to 346*a* are connected to the base 349. Power is supplied to the corresponding halogen heaters 341 to 346 by the lead wires 341*a* to 346*a*.

Figure 4:
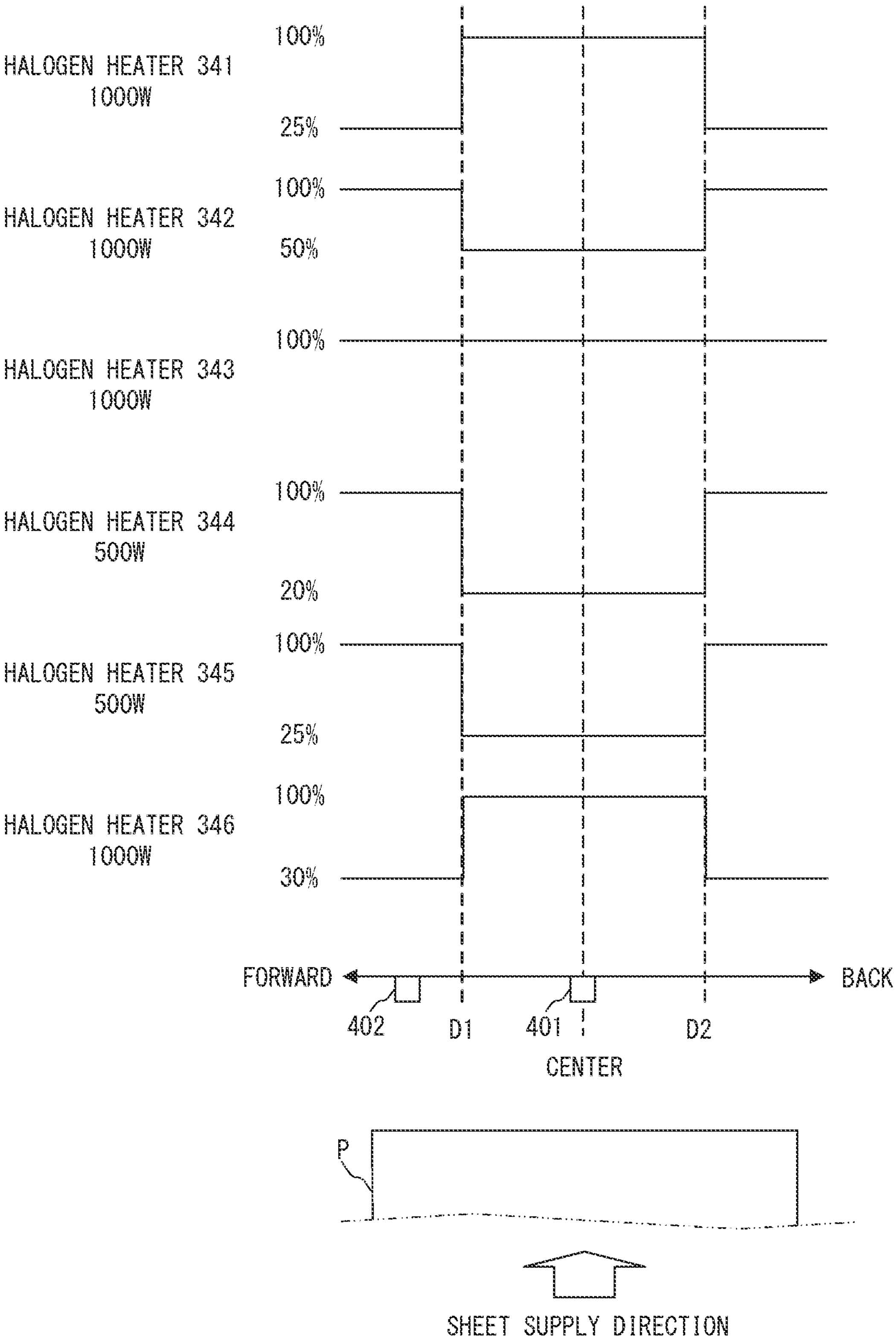
FIG. 4 is an explanatory diagram of exothermic distribution of a halogen heater.

FIG. 4 is an explanatory diagram of heat generation distribution of the six halogen heaters 341 to 346 of this embodiment. The horizontal axis represents positions of the halogen heaters 341 to 346 in a longitudinal direction (front-rear direction in FIG. 2), and the vertical axis represents a heat generation performance. The recording medium P is passed in a direction orthogonal to the longitudinal direction of the halogen heaters 341 to 346.

The six halogen heaters 341 to 346 have different heat generation distributions. The halogen heaters 341 and 346 mainly generate heat in central regions, with positions D1 and D2 in the longitudinal direction of halogen heaters 341 to 346 as boundaries. The halogen heaters 342, 344, and 345 mainly generate heat in end regions with positions D1 and D2 as boundaries. The halogen heater 343 generates heat in all areas. The halogen heaters 341 to 343 and 346 are supplied with power of 1000 W. The halogen heaters 344 and 345 are supplied with power of 500 W.

In such a configuration, it is possible to suppress heat accumulation at both ends of the heating roller 340 by lowering power supply ratios of the halogen heaters 342, 344, and 345, which generate heat mainly in the end regions. Therefore, even when the recording media P having a short width in the front-rear direction are continuously fed, both ends of the heating roller 340 can be prevented from becoming hot.

The thermistor 401 is arranged between the positions D1 and D2 and detects the temperature of the central region of the heating roller 340. The thermistor 402 is arranged outside the position D1 and detects the temperature of the end region of the heating roller 340. Thermistors 401 and 402 are arranged so as not to overlap positions D1 and D2, respectively. With this arrangement, the temperatures of the central region and the end regions of the heating roller 340 are detected.

In this embodiment, a length of heat-generating portions of the halogen heaters 341 to 346 is 500 mm, a distance from the proximal ends of the halogen heaters 341 to 346 to the position D1 is 125 mm, and a distance from the proximal ends of the halogen heaters 341 to 346 to the position D2 is 375 mm. As to an area from the proximal end to the position D1, an area from the position D1 to the position D2, and an area from the position D2 to the other end, the power supplied in each area is determined individually. For example, as to the halogen heater 341, the supplied power is 25% for the area from base end to the position D1 (end region), the supplied power is 100% for the area from the position D1 to the position D2 (central region), and the supplied power is 25% for the area from the position D2 to the other end (end region). Therefore, the power supplied to the halogen heater 341 is 100 W in the end regions of both ends of the halogen heater 341 and 800 W in the central region.

Figure 5:
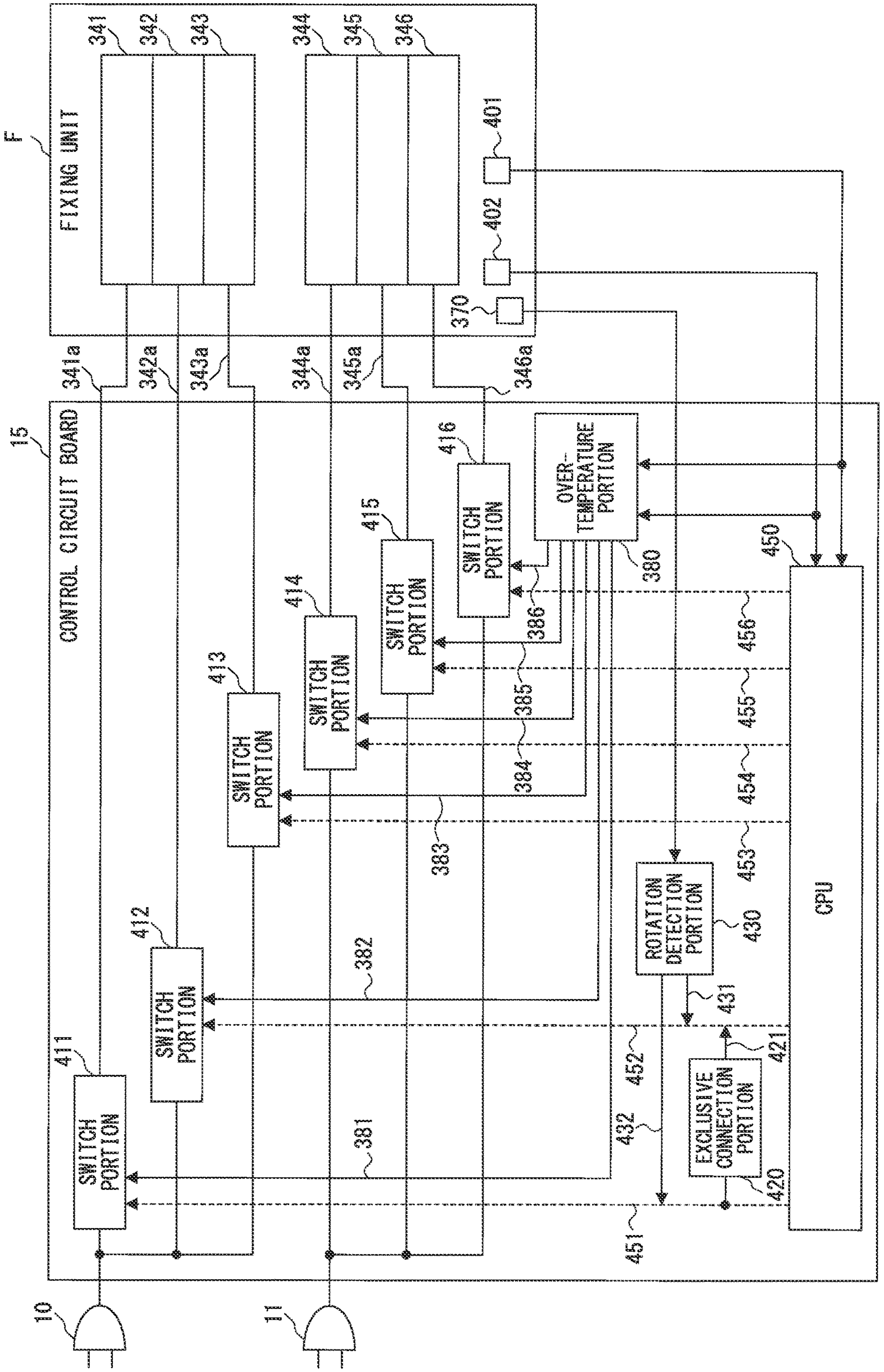
FIG. 5 is a configuration diagram of a control board.

FIG. 5 is a configuration diagram of a control board for driving and controlling the halogen heaters 341 to 346. Here, the configuration for the control board 15 to drive and control the halogen heaters 341 to 346 will be described, however, the control board 15 may have a configuration for controlling the overall operation of the image forming apparatus 100.

The control board 15 includes a CPU 450 and switch portions 411 to 416. The switch portions 411 to 416 are provided between the power cords 10, 11 and the halogen heaters 341 to 346. The switch portions 411 to 416 are connected to corresponding halogen heaters 341 to 346 via corresponding lead wires 341*a* to 346*a*, respectively. The switch portions 411 to 416 are switching elements for controlling power supply from the power cords 10, 11 to the corresponding halogen heaters 341 to 346. The switch portions 411 to 416 are composed of, for example, triacs, transistors, IGBTs (Insulated Gate Bipolar Transistors), and the like.

The power cord 10 is connected to the switch portions 411 to 413. The power cord 11 is connected to the switch portions 414 to 416. The switch portions 411 to 413 are connected to the halogen heaters 341 to 343. The switch portions 414 to 416 are connected to the halogen heaters 344 to 346.

The configuration including the power cord 10, the switch portions 411 to 413, the lead wires 341*a* to 343*a*, and the halogen heaters 341 to 343 is referred to as a first power supply system. The halogen heaters 341 to 343 are referred to as a first heater group. The configuration including the power cord 11, the switch portions 414 to 416, the lead wires 344*a* to 346*a*, and the halogen heaters 344 to 346 is referred to as a second power supply system. The halogen heaters 344 to 346 are referred to as a second heater group. The maximum power of each system is determined by a rating of the power cord, for example, the total power of the halogen heaters of each system is 2000 W or less. In a case where power is supplied to the halogen heaters 341 to 343 of the first heater group at the same time, the power becomes 3000 W, therefore, it is necessary to control power so that power is not supplied to the halogen heaters 341 to 343 at the same time.

Thermistors 401 and 402 detect the temperatures of the center area and end area of the heating roller 340, respectively, and transmit temperature information, which is a detection result, to the CPU 450. The CPU 450 detects the temperature of the heating roller 340 based on the temperature information obtained from the thermistors 401 and 402 to determine a power supply duty of the halogen heaters 341 to 346 based on the detected temperature. The CPU 450 outputs switching signals 451 to 456 for controlling the connection states of the switch portions 411 to 416 based on the determined power supply duty. The switch portions 411 to 416 are switched between a connected state and a disconnected state by the switching signals 451 to 456.

The CPU 450 performs processing of determining the power supply duty based on the temperature information acquired from the thermistors 401 and 402 at predetermined time intervals, in this case, 10 millisecond cycles. The switching of the switch portions 414 to 416, which are the second power supply system, is performed in units of two half wave cycles of the AC power supply. The CPU 450 transmits the switching signals 451 to 456 so as to control the halogen heaters 341 to 346 independently.

The control board 15 includes an overheating unit 380, an exclusion unit 420 and a rotation detection unit 430. In a case where at least one of the thermistor 401 and the thermistor 402 detects a temperature higher than a predetermined temperature, the overheating unit 380 transmits stop signals 381 to 386 to the switch portions 411 to 416. Due to these stop signals 381 to 386, the switch portions 411 to 416 become the disconnected state. The exclusion unit 420 exclusively connects any one switch portion to any one other switch portion. In this embodiment, the exclusion unit 420 exclusively connects the switch portion 411 and the switch portion 412. Therefore, the exclusion unit 420 outputs the signal 421 so that the switching signal 452 causes the switch portion 412 to be the disconnected state in a case where the switching signal 451 is a signal for causing the switch portion 411 to be connected state. The exclusion unit 420 outputs the signal 421 so that the switching signal 452 causes the switch portion 412 to be connected state in a case where the switching signal 451 is a signal for causing the switch portion 411 to be the disconnected state. The exclusion unit 420 prevents the halogen heater 341 and the halogen heater 342 from being supplied with power at the same time, and only one of them is supplied with power.

The switch portion 411 and the switch portion 412 (halogen heater 341 and halogen heater 342) connected to the exclusion unit 420 belongs to the same first power supply system and are supplied with power via the power cord 10. Since the exclusion unit 420 exclusively supply power to the halogen heater 341 and the halogen heater 342, the maximum power of the first power supply system is 2000 W or less. That is, the maximum power of the first power supply system is 2000 W or less in a case where the halogen heaters 341 and 343 are to be supplied with power at the same time, or even when the halogen heaters 342 and 343 are supplied with power at the same time.

The rotation detection unit 430 acquires the detection result by the sensor unit 370 provided in the fixing unit F. The sensor unit 370 detects the rotation speed of fixing belt 310. The rotation detection unit 430 converts a frequency of the signal representing a detection result of sensor unit 370. When the frequency representing the detection result of the sensor unit 370 is a predetermined frequency or more, the rotation detection unit 430 controls the switch portions 411 and 412 to be in the disconnected state so that the halogen heaters 341 and 342 cannot be supplied with power. The frequency of the signal representing the detection result of the sensor unit 370 represents a rotation speed of fixing belt 310.

For example, in a case where the frequency representing the detection result of the sensor unit 370 is 1 kHz or more, which corresponds to the rotational speed of the fixing belt 310 of 100 mm/s, the rotation detection unit 430 controls the switch portions 411 and 412 to be in the disconnected state. Therefore, the rotation detection unit 430 transmits switching signals 431 and 432 to the switch portions 411 and 412. In this manner, the rotation detection unit 430 suppresses power supply to the halogen heaters 341 and 342 in a case where the fixing belt 310 rotates at a predetermined rotation speed or less (100 mm/s or less).

FIG. 6 is a table showing the power supply duty of the halogen heaters 341 to 346 with respect to a width dimension of the recording medium P (hereinafter referred to as "sheet width"). Upon starting image forming (printing), the CPU 450 determines the power supply duty based on the sheet width of the recording medium P.

For example, in the case of a recording medium P having a sheet width of 148 mm or less, it is not necessary to raise the temperature to the edge region of the fixing belt 310 since the sheet width is narrow. Therefore, the power supply duty of the halogen heaters 341 and 346, which mainly generate heat in the central region, is set high. In the case of a recording medium P having a sheet width of 297 mm or more, it is necessary to raise the temperature to the edge of the fixing belt 310. Therefore, the power supply duty of the halogen heaters 342, 344, and 345, which mainly generate heat in the end regions, is set high.

In this manner, the halogen heater to be supplied with power is switched depending on the sheet width. The halogen heater 341 mainly generates heat in the center region, and the halogen heater 342 mainly generates heat in the end regions. Since the halogen heater 341 and the halogen heater 342 are used for different purposes in this way, the required temperature can be maintained by exclusively supplying power to the halogen heater 341 and the halogen heater 342 by the exclusion unit 420.

Figure 7A:
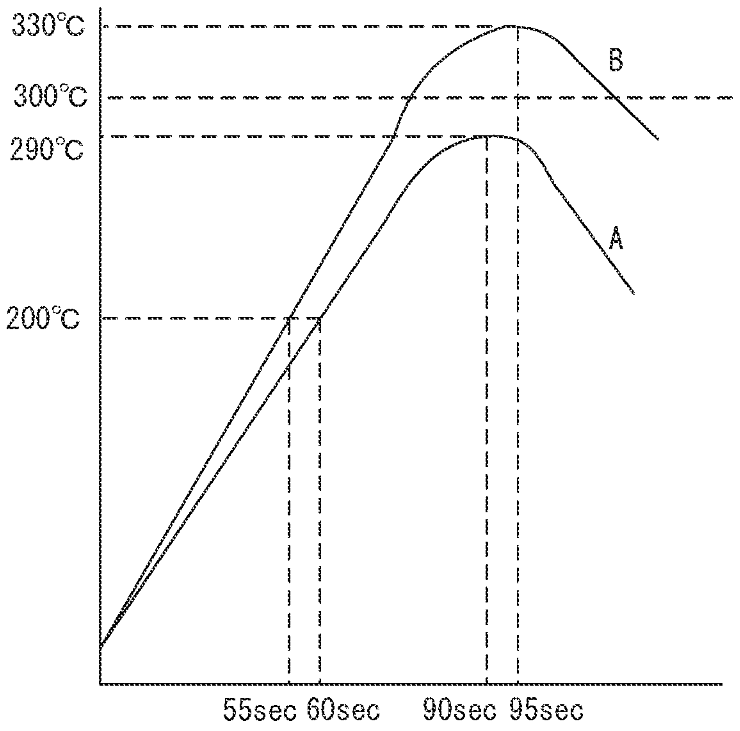
FIG. 7A and FIG. 7B are explanatory diagrams of temperature transition of a fixing belt.
Figure 7B:
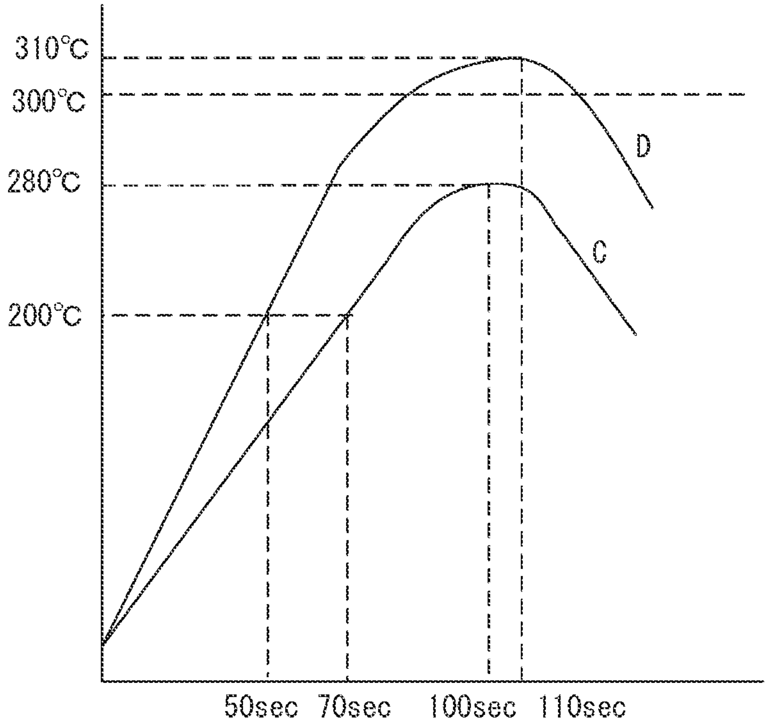

FIG. 7A and FIG. 7B are explanatory diagrams of the temperature transition of the fixing belt 310 in an abnormal energization state. FIG. 8 is an explanatory diagram of the operation modes of the image forming apparatus 100 and the total power consumption of each halogen heater 341 to 346.

FIG. 7A shows temperature transition in the abnormal energization state in a print mode. An image is formed on the recording medium P in the print mode. A waveform A represents the temperature transition in a case where the exclusion unit 420 operates to exclusively supply power to the halogen heater 341 and the halogen heater 342. A waveform B represents the temperature transition in a case where the exclusion unit 420 does not operate and power is supplied to the halogen heaters 341 and 342 at the same time.

As to the waveform A, the CPU 450 outputs the switching signals 451 to 456 so that the switch portions 411 to 416 are caused to be the connected state with the power supply duty of 100% in the abnormal energization state. Since waveform A indicates that the operation mode is the print mode, the fixing belt 310 rotates at a predetermined rotation speed (for example, 300 mm/s). The rotation detection unit 430 compares the rotation speed of the fixing belt 310 with a threshold value (for example, 100 mm/s). In a case where the rotation speed of the fixing belt 310 is higher than the threshold, the power supplied to the halogen heaters 341 and 342 is not stopped.

Since the exclusion unit 420 is operating, it outputs the signal 421 that stops the switching signal 452. Therefore, power is supplied to the halogen heaters 341, 343 to 346 with the power supply duty of 100%. In this state, the power of the entire heating roller 340 is 4000 W.

When the temperature of the thermistor 401 or thermistor 402 exceeds a predetermined threshold temperature, the overheating unit 380 outputs the stop signals 381 to 386 to cause the switch portions 411 to 416 to be the disconnected state. In this embodiment, the threshold temperature is 200° C. As to the waveform A, the temperature of the thermistor 401 or the thermistor 402 exceeds 200° C. 60 seconds after the occurrence of the abnormal energization state, and the switch portions 411 to 416 are caused to be the disconnected state. However, the temperature of the fixing unit F continues to rise due to responsiveness of the overheating unit 380 and the temperature overshoot of the fixing belt 310. The temperature of the fixing unit F reaches the maximum temperature 90 seconds after the occurrence of the abnormal energization state. At this time, the temperature of the fixing belt 310 reaches 290° C. In this embodiment, the temperature at which peripheral components of the fixing belt 310 are damaged is 300° C. Therefore, as to the waveform A, the operation can be stopped without damage to the parts even in the abnormal energization state.

As to the waveform B, the CPU 450 outputs the switching signals 451 to 456 so that the switch portions 411 to 416 are caused to be the connected state with the power supply duty of 100%. Since the exclusion unit 420 is not operated, power is supplied to the halogen heaters 341 to 346 with the power supply duty of 100%. In this state, the power of the entire heating roller 340 is 5000 W.

When the temperature of the thermistor 401 or thermistor 402 exceeds the threshold temperature, the overheating unit 380 outputs the stop signals 381 to 386 to cause the switch portions 411 to 416 to be the disconnected state. As to the waveform B, a slope of temperature rise is greater than that of waveform A because the power is greater. Therefore, as to the waveform B, the temperature of the thermistor 401 or the thermistor 402 exceeds 200° C. 55 seconds after the occurrence of the abnormal energization state, and the switch portions 411 to 416 are caused to be the disconnected state.

However, the temperature of the fixing unit F continues to rise due to responsiveness of the overheating unit 380 and the temperature overshoot of the fixing belt 310. The temperature of the fixing unit F reaches the maximum temperature 95 seconds after the abnormal energization state. At this time, the temperature of the fixing belt 310 reaches 330° C. In this embodiment, since the temperature at which the peripheral components of the fixing belt 310 are damaged is 300° C., as to the waveform B, there is a possibility that the peripheral components of the fixing belt 310 will be damaged in the abnormal energization state.

FIG. 7B shows temperature transition in the abnormal energization state in a standby mode. In the standby mode, no image is formed onto the recording medium P, and the image forming apparatus 100 waits for input of a job. Generally, it is not necessary to convey the recording medium P in the standby mode. For this reason, to prevent the rotating elements and the peripheral components from having a shorter life span due to wear, the rotation speed of the fixing belt 310 is set to be lower than that in the print mode. A waveform C represents the temperature transition in a case where the rotation detection unit 430 operates. A waveform D represents the temperature transition in a case where the rotation detection unit 430 does not operate and the exclusion unit 420 operates to exclusively supply electric power to the halogen heaters 341 and 342.

As to the waveform C, the CPU 450 outputs the switching signals 451 to 456 so as to cause the switch portions 411 to 416 to be the connected state with the power supply duty of 100% during the abnormal energization state. As to the waveform C, since the operation mode is the standby mode, the fixing belt 310 rotates at a predetermined rotation speed (for example, 50 mm/s) which is slower than that in the print mode. The rotation detection unit 430 compares the rotation speed of the fixing belt 310 with a threshold value (for example, 100 mm/s). In a case where the rotation speed of the fixing belt 310 is equal to or less than the threshold, the rotation detection unit 430 outputs switching signals 431 and 432 to stop the switching signals 451 and 452. Therefore, power is supplied to the halogen heaters 343 to 346 with the power supply duty of 100%. In this state, the power of the entire heating roller 340 is 3000 W.

In a case where the temperature of the thermistor 401 or thermistor 402 exceeds a predetermined threshold temperature (200° ° C. in this embodiment), the overheating unit 380 outputs the stop signals 381 to 386 to cause the switch portions 411 to 416 to be the disconnected state. As to the waveform C, the temperature of the thermistor 401 or the thermistor 402 exceeds 200° C. 70 seconds after the occurrence of the abnormal energization state, and the switch portions 411 to 416 are caused to be the disconnected state. However, the temperature of the fixing unit F continues to rise due to responsiveness of the overheating unit 380 and the temperature overshoot of the fixing belt 310. The temperature of the fixing unit F reaches the maximum temperature 100 seconds after the abnormal energization state. At this time, the temperature of the fixing belt 310 reaches 280° C. In this embodiment, since the temperature at which the peripheral components of the fixing belt 310 are damaged is 300° ° C., as to the waveform C, the operation can be stopped without damaging the components even in the abnormal energization state.

In the standby mode, it is not necessary to fix the toner image onto the recording medium P, and the power consumption in the standby mode is less than that in the print mode. Therefore, the fixing unit F can maintain the required temperature even if power is not supplied to the halogen heaters 341 and 342.

As to the waveform D, the image forming apparatus 100 operates in the same manner as in the case of the waveform A in the abnormal energization state. Since the exclusion unit 420 is operating, it outputs the signal 421 that stops the switching signal 452. Therefore, power is supplied to the halogen heaters 341, 343 to 346 with the power supply duty of 100%. In this state, the power of the entire heating roller 340 is 4000 W. Unlike the waveform A, since the waveform D is in the standby mode, the rotation speed of the fixing belt 310 is slower than that in the print mode. Therefore, the fixing belt 310 has poor heat dissipation, and the slope of the temperature rise increases.

As to the waveform D, the temperature of the thermistor 401 or the thermistor 402 exceeds 200° C. 50 seconds after the occurrence of the abnormal energization state, and the switch portions 411 to 416 are caused to be the disconnected state. However, the temperature of the fixing unit F continues to rise due to responsiveness of the overheating unit 380 and the temperature overshoot of the fixing belt 310. The temperature of the fixing unit F reaches the maximum temperature 110 seconds after the abnormal energization state. At this time, the temperature of the fixing belt 310 reaches 310° C. In this embodiment, the temperature at which peripheral members of the fixing belt 310 are damaged is 300° C. Therefore, as to the Waveform D, the peripheral components of the fixing belt 310 may be damaged in the abnormal energization state.

In addition, it is possible to transition from the standby mode to the print mode and vice versa. For example, when the rotation speed of the fixing belt 310 exceeds a predetermined rotation speed (e.g., 50 mm/s) in the standby mode, the CPU 450 switches the operation mode from the standby mode to the print mode.

As described above, the image forming apparatus 100 of the present embodiment can stop power supply to one halogen heater by the exclusion unit 420 in order to limit the power of the halogen heater in the print mode. Further, the image forming apparatus 100 can stop power supply to two halogen heaters by the rotation detection unit 430 in the standby mode in which the rotation speed of the fixing belt 310 is slow. Therefore, the image forming apparatus 100 of the present embodiment can minimize the damage to the components in the abnormal energization state.

The halogen heaters 341 and 342 connected to the switch portions 411 and 412, which are controllable by the exclusion unit 420, are connected to the power supply of the same system (first power supply system). Thereby, it is possible to control power to not exceed the maximum rating of the system. Further, the halogen heaters 341, 342 connected to the switch portions 411, 412, which are controllable by the exclusion unit 420, are the same as the halogen heaters 341, 342 connected to the switch portions 411, 412, which are controllable by the rotation detection unit 430. With this configuration, even if the exclusion unit 420 fails, the rotation detection unit 430 can operate in the print mode to forcibly stop the power supply to up to two halogen heaters. Therefore, it is possible to avoid temperature drop of the fixing unit F. This configuration can minimize device damage due to heat generation. Therefore, the costs associated with replacement parts and services for the image forming apparatus 100 can be reduced.

Although the sensor unit 370 detects the rotation speed of the fixing belt 310 in this embodiment, the method for detecting the rotation speed of the fixing belt 310 is not limited to this. For example, the rotation speed of the fixing belt 310 may be detected by detecting the rotation speed of a motor (not shown) that drives fixing belt 310. Further, the fixing unit F in this embodiment is of a belt heating type, however, the fixing unit F can be of any type. For example, the heating unit 300 may be composed of a rotating body (roller) having a plurality of heat generating sources (halogen heaters). The Heat generating sources of the rotating body will be controlled by the control board 15 as described above. In this case, the rotation detection unit 430 detects the rotation speed of the rotating body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-005896, filed Jan. 18, 2022, which is hereby incorporated by reference herein in its entirety.

What is claimed is:

1. An image forming apparatus, comprising:

a heating unit including a heating rotation member configured to heat a recording medium:

a pressure rotation member which contacts the heating rotation member to form a nip portion to fix a toner image to the recording medium, a heat source configured to heat the heating rotation member, the heat source including a first heater and a second heater, and a control unit configured to control the first heater and the second heater, wherein the image forming apparatus is operable to transition to:

a fixing state in which an operation to fix the toner image to the recording medium is performed by receiving a job; and a standby state, to wait for the job, in which an operation to fix the toner image to the recording medium is not performed, wherein a rotation speed of the heating rotation member in the standby state is lower than the rotation speed of the heating rotation member in the fixing state, wherein the control unit is configured to:

stop supplying power to the first heater and allow supplying power to the second heater in the standby state; and allow supplying power to the first heater and the second heater in the fixing state.

2. The image forming apparatus according to claim 1, wherein the heat source includes the first heater, the second heater, and a third heater.

3. The image forming apparatus according to claim 2, further comprising:

a first power supply system to which power is supplied via a first power cord; and a second power supply system to which power is supplied via a second power cord, wherein the first heater and the third heater are included in the first power supply system, and the second heater is included in the second power supply system.

4. The image forming apparatus according to claim 2, wherein, in a width direction of the heating rotation member, a heat generation ratio of the first heater in a center region of the first heater is higher than a heat generation ratio of any end region of the first heater, and wherein, in the width direction of the heating rotation member, a heat generation ratio of the third heater in the center region of the third heater is lower than a heat generation ratio of any end region of the third heater.

5. The image forming apparatus according to claim 4, wherein the control unit is configured to:

stop supplying power to the third heater in a case where power is supplied to the first heater in the fixing state; and stop supplying power to the first heater in a case where power is supplied to the third heater in the fixing state.

6. The image forming apparatus according to claim 5, wherein the control unit is configured to stop supplying power to the third heater and the first heater in the standby state.

7. The image forming apparatus according to claim 1, wherein the heat source is a halogen heater.

8. The image forming apparatus according to claim 1, wherein the control unit is configured to stop power supply to the heat source in a case where a temperature of the heating rotation member exceeds a threshold.

9. The image forming apparatus according to claim 1, wherein the heating rotation member is a rotatable belt.

10. The image forming apparatus according to claim 1, further comprising a rotation detection unit to detect the rotation speed of the heating rotation member.

11. The image forming apparatus according to claim 10, wherein the rotation detection unit is configured to contact an outer surface of the heating rotation member.

12. The image forming apparatus according to claim 10, wherein in a case where the rotation speed of the heating rotation member detected by the rotation detection unit is equal to or less than a predetermined rotation speed, the control unit is configured to stop supplying power to the first heater and allow supplying power to the second heater in the standby state.

13. The image forming apparatus according to claim 10, wherein in a case where the rotation speed of the heating rotation member detected by the rotation detection unit is more than a predetermined rotation speed, the control unit is configured to allow supplying power to the first heater and the second heater in the fixing state.

14. The image forming apparatus according to claim 1, wherein the image forming apparatus is configured to become the fixing state from the standby state in a case where the rotation speed of the heating rotation member exceeds a predetermined rotation speed in the standby state.

15. The image forming apparatus according to claim 1, wherein the control unit is configured to allow supplying power to the first heater and the second heater in a case where the recording medium is conveyed to the nip portion by receiving the job.

* * * * *